United States Patent
Rogren (10) Patent No.: US 11,165,101 B2
(45) Date of Patent: *Nov. 2, 2021

(54) HYBRID SOLID-STATE CELL WITH A SEALED ANODE STRUCTURE

(71) Applicant: Sakuu Corporation, San Jose, CA (US)

(72) Inventor: Philip Eugene Rogren, Half Moon Bay, CA (US)

(73) Assignee: Sakuu Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/179,719

(22) Filed: Feb. 19, 2021

(65) Prior Publication Data

US 2021/0175549 A1 Jun. 10, 2021

Related U.S. Application Data (60) Continuation of application No. 16/898,126, filed on Jun. 10, 2020, now Pat. No. 10,971,760, which is a
(Continued)

(51) Int. Cl.
*H01M 10/0562* (2010.01)
*B29C 64/106* (2017.01)
(Continued)

(52) U.S. Cl.
CPC ....... *H01M 10/0585* (2013.01); *B29C 64/106* (2017.08); *B33Y 80/00* (2014.12);
(Continued)

(58) Field of Classification Search
None
See application file for complete search history.

(56) References Cited

U.S. PATENT DOCUMENTS 3,201,278 A 8/1965 Kurtzweil et al.
5,776,632 A 7/1998 Honegger
(Continued)

FOREIGN PATENT DOCUMENTS

WO 1998/037588 A1 8/1998
WO 20161197006 A1 12/2016
WO 2019/152531 A1 8/2019

OTHER PUBLICATIONS

International Search Report and Written Opinion for PCT/US2019/015868 dated Jun. 3, 2019.
(Continued)

*Primary Examiner* — Jonathan Crepeau
(74) *Attorney, Agent, or Firm* — NovoTechIP International PLLC (57) ABSTRACT

A monolithic ceramic electrochemical cell housing is provided. The housing includes two or more electrochemical sub cell housings. Each of the electrochemical sub cell housing includes an anode receptive space, a cathode receptive space, a separator between the anode receptive space and the cathode receptive space, and integrated electron conductive circuits. A first integrated electron conductive circuit is configured as an anode current collector within the anode receptive space. A second integrated electron conductive circuit is disposed as a cathode current collector within the cathode receptive space.

21 Claims, 5 Drawing Sheets

Related U.S. Application Data continuation-in-part of application No. 16/702,417, filed on Dec. 3, 2019, now abandoned, which is a division of application No. 16/262,058, filed on Jan. 30, 2019, now Pat. No. 10,535,900.

(60) Provisional application No. 62/624,476, filed on Jan. 31, 2018.

(51) Int. Cl.

| | | |
|---|---|---|
| *H01M 4/64* | (2006.01) | |
| *B33Y 80/00* | (2015.01) | |
| *H01M 50/30* | (2021.01) | |
| *H01M 50/183* | (2021.01) | |
| *H01M 50/531* | (2021.01) | |
| *H01M 50/512* | (2021.01) | |
| *H01M 50/10* | (2021.01) | |
| *H01M 4/66* | (2006.01) | |
| *H01M 10/0585* | (2010.01) | |
| *H01M 10/052* | (2010.01) | |

(52) U.S. Cl.
CPC ............ *H01M 4/64* (2013.01); *H01M 4/661* (2013.01); *H01M 4/663* (2013.01); *H01M 4/664* (2013.01); *H01M 4/666* (2013.01); *H01M 10/052* (2013.01); *H01M 10/0562* (2013.01); *H01M 50/10* (2021.01); *H01M 50/183* (2021.01); *H01M 50/30* (2021.01); *H01M 50/394* (2021.01); *H01M 50/512* (2021.01); *H01M 50/531* (2021.01); *H01M 2220/20* (2013.01); *H01M 2300/0068* (2013.01)

(56) References Cited

U.S. PATENT DOCUMENTS

| | | |
|---|---|---|
| 6,168,884 B1 | 1/2001 | Neudecker et al. |
| 6,713,987 B2 | 3/2004 | Krasnov et al. |
| 6,805,999 B2 | 10/2004 | Lee et al. |
| 7,829,225 B2 | 11/2010 | Salot et al. |
| 8,304,115 B1 | 11/2012 | Petkov et al. |
| 9,289,611 B2 | 3/2016 | Viavattine |
| 2003/0134188 A1 | 7/2003 | Roy et al. |
| 2003/0235738 A1 | 12/2003 | Zheng |
| 2004/0175603 A1 | 9/2004 | Yang et al. |
| 2007/0037058 A1 | 2/2007 | Visco et al. |
| 2007/0117007 A1 | 5/2007 | Visco et al. |
| 2008/0153000 A1 | 6/2008 | Salot et al. |
| 2010/0330401 A1 | 12/2010 | Oukassi et al. |
| 2013/0071741 A1 | 3/2013 | Ohara et al. |
| 2013/0244085 A1 | 9/2013 | Coors et al. |
| 2014/0375325 A1 | 12/2014 | Wang et al. |
| 2015/0099188 A1 | 4/2015 | Holme et al. |
| 2017/0271635 A1 | 9/2017 | Lampe-Onnerud et al. |
| 2018/0019493 A1 | 1/2018 | Jakus et al. |
| 2018/0219251 A1 | 8/2018 | Rogren |
| 2019/0237808 A1 | 8/2019 | Rogren |
| 2019/0273258 A1 | 9/2019 | Thomas-Alyea et al. |
| 2020/0075960 A1 | 3/2020 | Wachsman et al. |
| 2020/0106135 A1 | 4/2020 | Rogren |

OTHER PUBLICATIONS

International Search Report and Written Opinion for PCT/US2019/67856 dated Apr. 29, 2020, 11 pages.

Bates et al., Lithium-Free Thin-Film Battery in in Situ Plated Li Anode, J. Electrochem Soc., 1999, vol. 147(2), pp. 517-523.

HYBRID SOLID-STATE CELL WITH A SEALED ANODE STRUCTURE

CROSS-REFERENCE TO RELATED APPLICATIONS

The present application is a continuation application of U.S. patent application Ser. No. 16/898,126 entitled "Hybrid Solid-State Cell with a Sealed Anode Structure," filed Jun. 10, 2020, which is a continuation-in-part application of U.S. patent application Ser. No. 16/702,417 entitled "Hybrid Solid-State Cell with a Sealed Anode Structure," filed Dec. 3, 2019, which is a divisional application of U.S. patent application Ser. No. 16/262,058 entitled "Hybrid Solid-State Cell with a Sealed Anode Structure," filed Jan. 30, 2019, now U.S. Pat. No. 10,535,900, which claims priority to U.S. Provisional Application No. 62/624,476 entitled "HYBRID SOLID-STATE CELL", filed Jan. 31, 2018, the contents of which are incorporated by reference in its entirety.

The present application is also related to U.S. patent application Ser. No. 15/883,698, entitled "CERAMIC LITHIUM RETENTION DEVICE," filed Jan. 30, 2018, the disclosure of which is hereby incorporated herein by reference in its entirety.

FIELD OF THE INVENTION

The present invention relates to a monolithic ceramic electrochemical cell housing and associated methods of manufacturing.

BACKGROUND

Lithium ion batteries (LIBs) provide significant improvements in energy density and cost per watt hour compared to the NiCad and Lithium metal hydride cells that preceded them. Notwithstanding, the manufacturing costs to produce a LIB is cost prohibitive in electric vehicles. Furthermore, the low energy density causes our electronic gadgets to be larger and bulkier than desirable. Recent improvements in the field have attempted to address these drawbacks by increasing the density of solid-state cells.

While cells with lithium metal anodes provide superior energy density, rechargeable cells cannot be constructed with lithium metal anodes because of the risk of dendrite formation during the charge cycle. The dendrite formation during the charge cycle results in short circuits that cause explosion and combustion during ignition of the liquid electrolyte. The liquid electrolyte is a highly combustible organic solvent and does prevent dendrite growth between the anode and cathode. As a result, LIBs are typically made up of intercalation anodes, which allow lithium ions to be inserted into the crystalline structure rather than being plated onto a current collector. Inserting the lithium ions into the crystalline structure reduces the effective energy storage capacity of the anode to less than 10% the theoretical capacity of lithium metal.

Liquid electrolyte also limits a maximum voltage for the battery. Typical liquid electrolytes decompose above four-volts difference between an anode and a cathode, which effectively limits the maximum open circuit voltage of LIBs to about 3.8-volts. Cathode materials that can produce 6 volts against a lithium anode are considered practical, but not usable in cells with liquid electrolyte. The ability to use such high voltage cathodes could increase the energy density of the cells by 50%.

An obvious solution is to use a nonflammable electrolyte that resists dendrite formation, is unaffected by potentials above 6 volts, and possesses ionic conductivities equaling or approaching those of the liquid electrolytes. While ceramics with high lithium ion conductivities meet those requirements, they also have physical and chemical properties that prevent practical implementations. For example, ceramic materials are typically very rigid and brittle. Furthermore, a practical cell is made up of stacks of sub cells, each in turn includes very thin layers of the basic components of an electrochemical cell. Common approaches include constructing a cell by producing the thin layers (<40 μm for the separator) in sheets and assembling them in order. However, the thin layers are fragile and rarely flat, causing a discontinuous contact between individual layers across the meeting surfaces. Applying pressure to the stack of layers tends to improve the contact, but unacceptably increases the risk of fracturing a layer.

Moreover, applying pressure to the stack of layers fails to create an integrated connection between layers, rather it creates pressure contact between two surfaces. Typical battery materials are chemically active causing the contact to react with the surrounding environment. In other words, surface contacts, even between like materials, will be susceptible to increased ionic and/or electrical resistance at the points of contacts.

Other drawbacks associated with a cell with lithium metal anode includes a difficulty in achieving a true hermetic seal around the anode space. Any oxygen or water ingress into the anode space will cause oxidation of the lithium, so a non-hermetic seal reduces the capacity and eventually destroys the cell as oxygen or water leak into the cell. Although, it is clear liquid electrolyte poses significant drawbacks, liquid electrolyte is able to flow into any open space where a lithium atom was oxidized to a lithium ion and moves across the separator to the cathode, to maintain the ionic conductivity throughout the cell. Ceramic electrolyte does not possess this ability. As a result, the conventional approach to using ceramic electrolyte is to create a planar interface between the lithium metal and the ceramic cathode. In this way, only a thin layer of lithium close to the ceramic electrolyte can oxidize and move into the electrolyte. The result is a very big limitation to the energy storage capacity of the anode. Thin film solid-state cells epitomize this drawback because the useable thickness of the lithium metal anode is only a fraction of the metal deposited.

There is a need to address the short comings of current solid-state cell development efforts.

SUMMARY

A monolithic ceramic electrochemical cell housing is provided. The housing includes two or more electrochemical sub cell housings. Each of the electrochemical sub cell housing includes an anode receptive space, a cathode receptive space, a separator between the anode receptive space and the cathode receptive space, and integrated electron conductive circuits. A first integrated electron conductive circuit is configured as an anode current collector within the anode receptive space. A second integrated electron conductive circuit is disposed as a cathode current collector within the cathode receptive space.

In some embodiments, the anode receptive spaces are configured as hermetically sealed volumes, partially filled with strands of solid-state electrolyte material. The solid-state electrolyte material includes a high-density ceramic. The high-density ceramic can be selected from a group consisting of: sulfides, borides, carbides, nitrides, phosphides, oxides, selinides, florides, chlorides, bromides, iodides, or combinations thereof. The strands of solid-state electrolyte can form a network of continuous ionic conductivity between the separator and the anode current collector.

The strands of electrolyte can occupy between 20% and 80% volume of the anode receptive spaces. The anode current collector can serve as current collector for the anode receptive spaces of the electrochemical sub cell housing and second anode receptive spaces of a second adjacent electrochemical sub cell housing.

The cathode receptive spaces can be partially filled with strands of ceramic material between 1% and 60% volume. In another embodiment, the cathode receptive spaces can be devoid of ceramic electrolyte material. The monolithic ceramic electrochemical cell housing can also include insulating material between each of the electrochemical sub cell housing.

The cathode layer can include a seal structure in a filling aperture configured to contain catholyte. The seal structure can be configured to isolate the catholyte and provide pressure relief from the cathode receptive spaces. The anode receptive spaces can be filled with anode active material during an initial charging phase.

The anode receptive spaces can be sealed and the cathode receptive spaces can be partially sealed. The monolithic ceramic electrochemical cell housing can also include an anode electrical contact connecting anode sub-cell current collectors and a cathode electrical contact connecting cathode sub-cell current collectors.

A manufacturing method for assembling a monolithic ceramic electrochemical cell housing is also provided. The method can include depositing precursor materials in a flexible format to form a multi-layer structure. The method can also include heating the multi-layer structure to convert the precursors into a single monolithic structure void of physical interfaces between deposited layers. In some embodiments, the format is fluid, selected from a group consisting of pastes, flowable powders and green tapes. In some embodiments, the precursors are deposited using additive manufacturing techniques.

BRIEF DESCRIPTION OF THE DRAWINGS

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings.

DETAILED DESCRIPTION

The present invention is described with reference to the attached figures, where like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

In view of the foregoing, embodiments disclosed herein are directed to an apparatus and a manufacturing process for producing a monolithic ceramic electrochemical cell housing. The monolithic ceramic electrochemical cell housings are produced at a per watt costs below current lithium ion batteries (LIBs). The volumetric energy densities are significantly higher than current LIBs, and in capacities ranging from a few milliwatt hours to kilowatt hours. In some embodiments, multi-material additive processes are incorporated to assemble the cells from precursors of the final materials, and convert the precursors to their final properties when the assembly is complete. These multi-material additive processes are implemented to eliminate the drawbacks of assembling cells from ceramic sheets with their final properties. The precursors can be in a fluid or plastically deformable sheet state, which can be layered and bonded together as precursors. The precursors in this state are also easy to handle and form into the desired configuration.

As a result, after the conversion to the final properties the resulting structure is a monolithic block with no discernable interface where adjacent layers were joined. The interface of the layers of dissimilar precursor materials is designed chemically and physically to optimize the conductivity between the two final materials. Specifically, a true chemical bond can be formed at the interface, avoiding the possibility of uncontrolled reactions with the environment or incomplete contact between materials will compromise the desired properties of the interface. Conversion of the precursors in some embodiments include heat treatment processes that remove organic material components of the precursors, convert the remaining constituents to the final desired chemistry, and sinter the final materials to their respective density targets.

The disclosed multi-material additive processes also produce a design that allows the liquid electrolyte to maintain ionic conductivity completely across an electrode space regardless of the state of charge. For examples, a porous structure of electrolyte can be created across an anode space, which forms a fully interconnected web of ionic conductive material from the solid electrolyte separator to the current collector of the electrode. The porous structure can be configured such that the distance between adjacent portions of the ionically conductive web is less than two-times the maximum distance an ion can be transferred into the ionically conductive electrolyte.

The disclosed multi-material additive processes also provide a cost-effective configuration of a hybrid cell design that incorporates a cathode with a similar composition to the typical cathodes employed in conventional lithium ion cells, and an anode that it is a hermetically sealed space. Specifically, the anode can be bounded by the current collector on one side, the separator on the opposite side, filled with the ionically conductive porous structure, and void of any intercalation host or active charge transfer species immediately following manufacture of the cell structure. The active charge transfer species (e.g., lithium) can be introduced to the anode space by plating lithium from the cathode to the anode current collector during the conditioning, or first charging of the cell.

Figure 1:
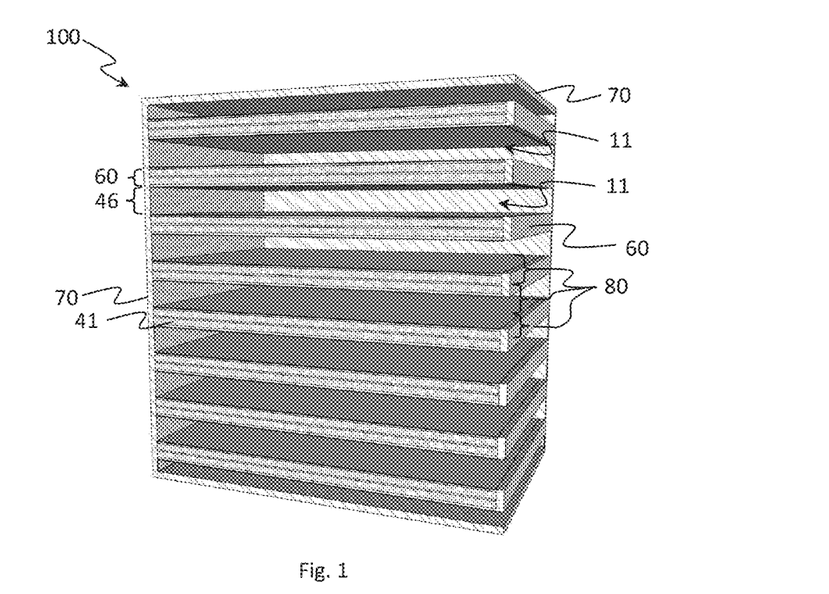
FIG. 1 illustrates an exemplary solid-state cell, in accordance with an embodiment of the disclosure.
Figure 2:
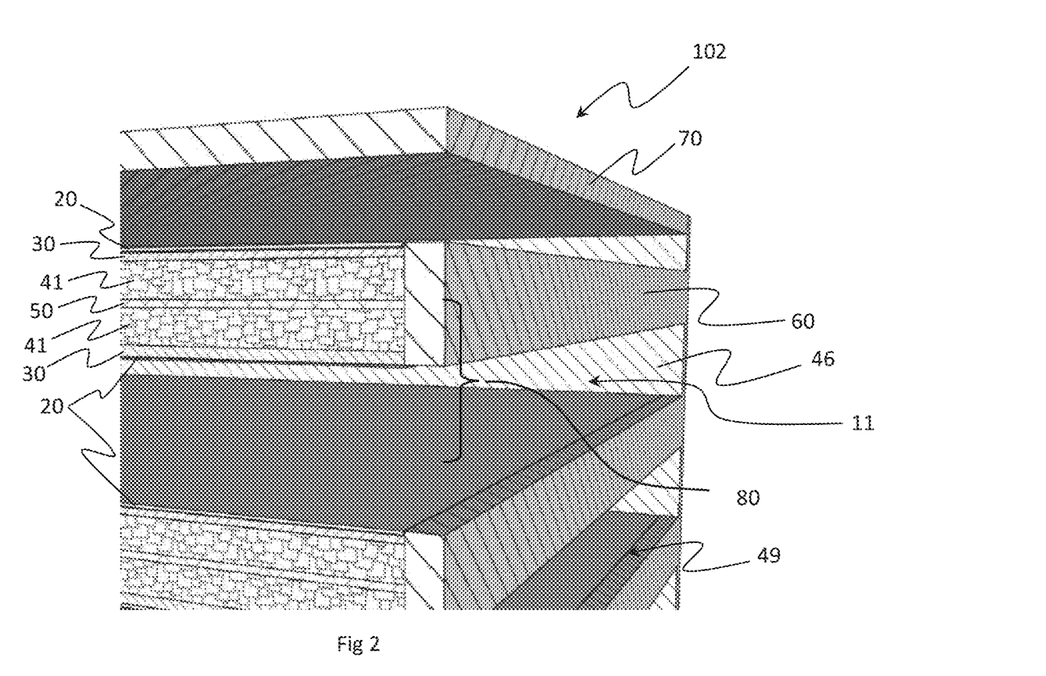
FIG. 2 illustrates an integrated framework of the exemplary solid-state cell of FIG. 1, in accordance with an embodiment of the disclosure.

FIG. 1 illustrates an exemplary solid-state cell 100 in accordance with an embodiment of the disclosure. The general structure of the solid-state cell 100 can include a monolithic and highly integrated framework 102, as illustrated in FIG. 2. The integrated framework 102 can include one to thousands of stacked sub cells housings 80.

Referring to FIG. 2, each sub-cell housing 80, with alternating thin layers, can include an anode receptive space 41 and a cathode receptive space 11. The anode receptive space 41 and cathode receptive space 11 can be separated by a thin separator 30, which may be made up of solid-state electrolyte. Each anode receptive space 41 can be made up of a hermetically sealed, defined volume, partially filled with strands of solid-state electrolyte material (shown in FIG. 3 as 32).

Figure 3:
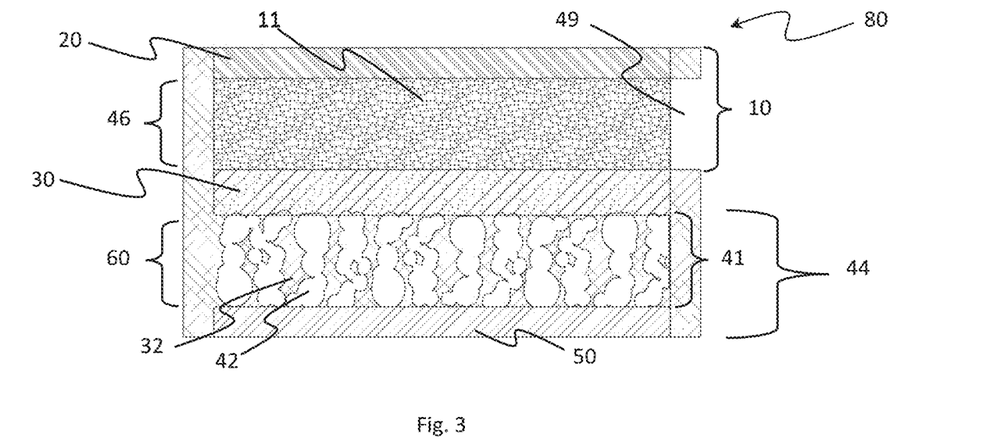
FIG. 3 illustrates a sub-cell housing, in accordance with an embodiment of the disclosure.
Figure 4:
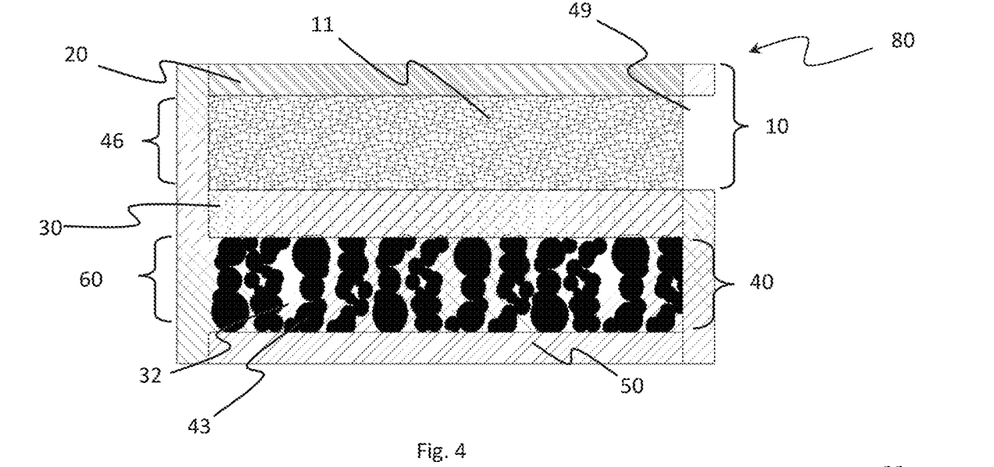
FIG. 4 illustrates a sub-cell housing, in accordance with an embodiment of the disclosure.

Referring to FIG. 3, the hermetically sealed, defined volume, partially filled with strands of solid-state electrolyte material 32 form a region of controlled porosity (referred to herein as the "empty space 42"). The solid-state electrolyte material 32 can include a high-density ceramic. For the purposes of this example, the high-density ceramic can include, but is not limited to, sulfides, borides, carbides, nitrides, phosphides, oxides, selinides, florides, chlorides, bromides, iodides, or combinations of thereof. The high-density ceramic can include any ceramic that exhibits room temperature conductivities of the intended charge transfer ion of the specific battery design, greater than $1 \times 10^{-6}$ S/cm. In some embodiments, the charge transfer ion is $Li^+$. In alternative embodiments, the charge transfer ion can be either $Na^+$, $Mg^+$, $K^+$, and $Al^{+3}$.

The strands of solid-state electrolyte 32 can form a network of continuous ionic conductivity between the separator 30 and the anode current collector 50. The porous electrolyte structure can be made from solid-state electrolyte material, similar to the separator 30, but with a controlled structure. Continuous strands of electrolyte can be surrounded by the empty space 42 and extend from the separator 30 and the current collector 50. The empty space 42 can also extend from the separator 30 to the anode current collector 50. In some embodiments, the strands of electrolyte can occupy between 20% and 80% of the volume of the anode receptive space 41 (also shown in FIG. 2) while the void space occupies the remaining volume. In some embodiments, the porous structure is designed such that the average distance between adjacent strands of electrolyte material can be between 0.000001 mm and 0.040 mm. Referring back to FIG. 2, the anode receptive spaces 41 for two adjacent sub cell housings 80 can be juxtaposed, separated by the current collector 50. The current collector 50 can serve as current collector for both anode receptive spaces 41 of the two adjacent sub cell housings 80.

Each cathode receptive space 11 can also be a defined volume partially filled with strands of ceramic material. In some embodiments, the cathode receptive space 11 can form a region of controlled porosity. In other embodiments, the cathode receptive space 11 can be an open defined volume free of any ceramic material. In some embodiments, strands of electrolyte material in the cathode receptive space 11 can occupy from 0% to 60% of the total volume. Furthermore, the strands of electrolyte material can be designed such that the average distance between adjacent strands of electrolyte material can be between 0.02 mm and 200 mm.

The strands of ceramic material can include solid state electrolyte material that provides ionic conductivity across the thickness of the cathode space similar to the porous structure in the anode receptive space 41. Alternatively, the ceramic strands can be provided as mechanical elements to control the precise thickness of the cathode receptive space 11.

In some embodiments, the cathode receptive spaces 11 of two adjacent sub cell housings 80 can be configured such that one cathode receptive space serves said two adjacent sub cell housings 80. Referring momentarily to the cathode current collectors 20 in FIG. 2 and FIG. 11. Each of the two adjacent sub cells can be configured with an electron conductive layer directly on the cathode side of the separators 30. The cathode receptive space 11 (shown in FIG. 11) of the two sub cell housings can be bounded on either side by cathode current collectors 20 of the two adjacent cell housings. The distance between the separators 30 of the two adjacent sub cell housings can be calculated to create a cathode receptive space 11 volume that includes an amount of catholyte that meets the design parameters of the two adjacent sub cells.

Figure 11:
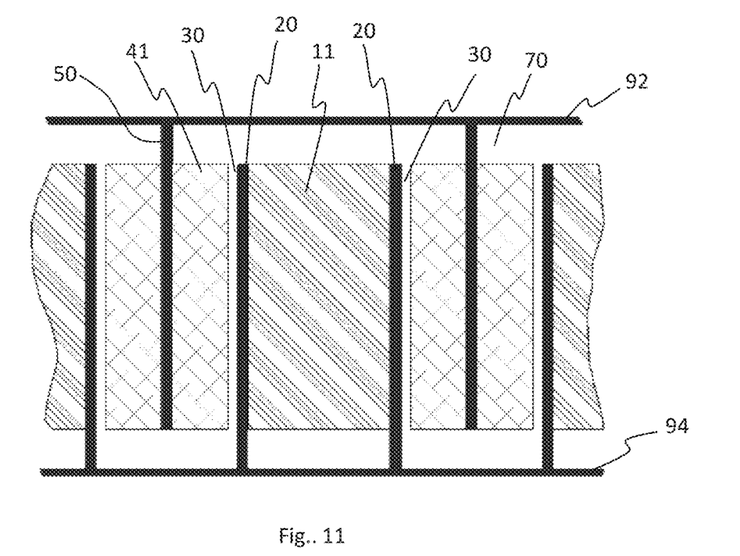
FIG. 11 illustrates a cell schematic of the exemplary solid-state cell of FIG. 1, in accordance with an embodiment of the disclosure.

With reference to FIGS. 2 and 11, a cathode current collector 20 of a sub-cell 80 may be positioned in direct contact with a surface of a sub-cell separator 30, opposite the surface defining one surface of the sub-cell anode receptive space 41, thus defining one boundary of cathode receptive space 11. Two adjacent sub-cells 80 may be juxtaposed in contact, cathode receptive space 11 to cathode receptive space 11, with current collectors for each of the two cathode receptive spaces 11 positioned in contact with the cathode side of the separator 30 of the respective sub-cell 80. The resulting cathode receptive space 11 may thus be a volume sufficient to contain cathode material for two sub-cells 80 and the major surfaces of cathode receptive space 11 defined by the current collectors 20 of the two adjacent sub-cells. The advantages of this arrangement are that two very thin current collectors 20 supported on a separator 30 can occupy less volume than a single unsupported current collector positioned to separate two cathode receptive spaces 11. Secondly, positioning the current collectors at the periphery of a cathode receptive space creates a single double thick cathode receptive space, facilitating easier insertion of the cathode material into the cathode receptive space 11.

The cathode current collectors 20 may be comprised of a metal or a metal alloy or a conductive ceramic, or a conductive carbon based material. Cathode current collectors 20 may be further comprised of an ion conducting material chosen to conduct the intended charge transfer ion of the specific battery design. The ion conducting material of the cathode current collectors 20 may be the same solid-state electrolyte as comprises the anode receptive space 41 and the separator 30. In one embodiment, the ion conducting material is lithium lanthanum zirconate. The metal or metal alloy or conductive ceramic or conducting carbon-based material of the cathode current collectors 20 may comprise a porous film that forms an electronic percolating network through the plane of cathode current collector 20. The metal or metal alloy or conductive ceramic or conducting carbon based material of the cathode current collectors 20 may comprise any value or values between 20% and 99% by volume of the cathode current collector 20. In some embodiments, a current collector 20 may be present on only one side of cathode receptive space 11.

Figure 9:
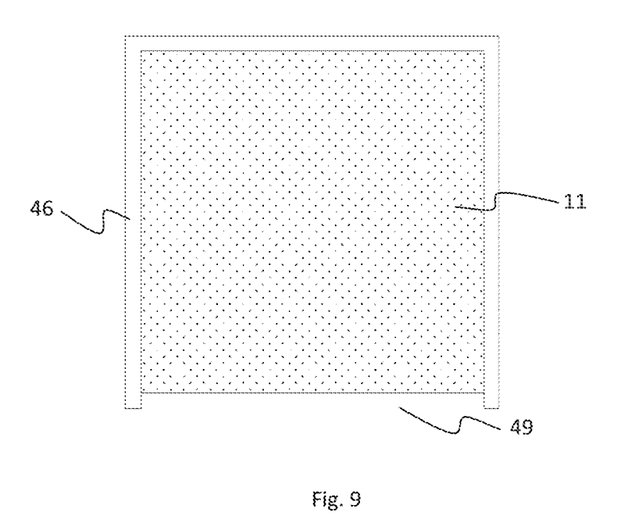
FIG. 9 illustrates a cathode layer of the exemplary solid-state cell of FIG. 1, in accordance with an embodiment of the disclosure.

Referring back to FIG. 2, the cathode receptive space 11 can be further defined by low porosity ceramic walls 46 extending between the separators 30 to create a seal between the separators 30. The ceramic walls (shown in FIG. 9 as 46) can extend around at least 60% of the periphery of the cathode receptive space 11. The low porosity ceramic can be made up of solid-state electrolyte.

Figure 7:
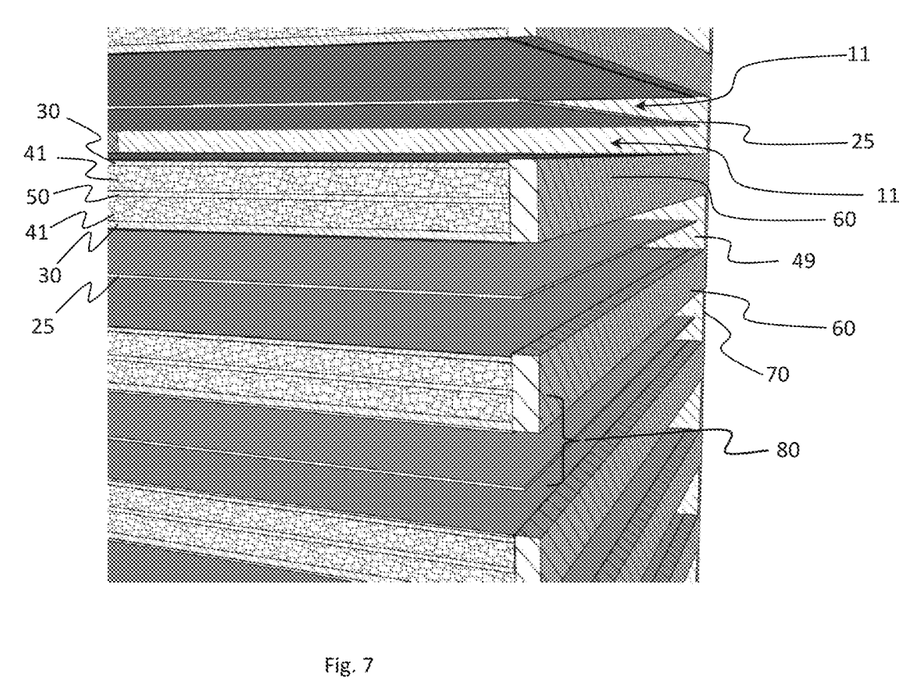
FIG. 7 illustrates an alternate integrated framework of the exemplary solid-state cell of FIG. 1, in accordance with an embodiment of the disclosure.

With reference to FIG. 7, in some embodiments, each sub-cell housing 80 can be separated from surrounding sub-cell housings 80 by layers of insulating material 25. The insulating material can be disposed between the separators of adjacent sub cell housings, at a calculated distance. The distance can be calculated to create cathode receptive space 11 volume and anode receptive space 41 volume to contain an amount of catholyte and charge transfer species. The amount of catholyte and charge transfer species are designed to meet the configuration parameters of the sub-cell 80. In these embodiments, current collectors can be disposed on the surfaces of the layer of insulating material 25 or anywhere within the cathode receptive space 11.

Figure 8:
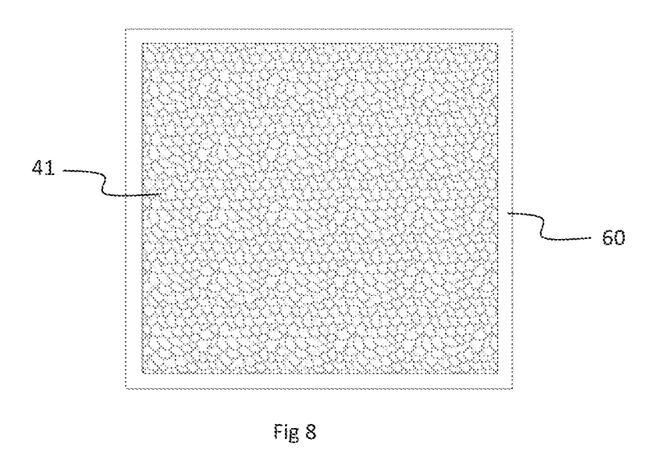
FIG. 8 illustrates an anode layer of the exemplary solid-state cell of FIG. 1, in accordance with an embodiment of the disclosure.

FIG. 3 illustrates a sub-cell housing 80, in accordance with an embodiment of the disclosure. Each sub-cell housing 80 is a layered structure, which can include solid-state electrolyte with alternating layers of high density electrolyte material. The sub-cell housing 80 also can include layers with a high degree of controlled porosity. The layers include anode layers 44, cathode layers 10, and separator layers 30. The anode and cathode layers can be made up of high porosity while the separator layers can be made up of high density electrolyte. The anode layers 44 can include anode receptive spaces 41, low porosity boarders 60 (Shown in FIG. 8), and anode current collectors 50. The cathode layers 10 can be made up of cathode receptive space 11, low porosity boarder 46 and a filling aperture 49 (shown in FIG. 9). The low porosity border 46 can be made up of high density ceramic material. In some embodiments, the high density ceramic material can include solid-state electrolyte. The low porosity border 60 completely and hermetically seals the anode receptive spaces 41 from the environment. The low porosity border 46 can also partially surround the cathode receptive spaces 11, physically isolating the cathode receptive space from other layers in the sub-cell housing.

Referring back to FIG. 3, the separators 30 are configured to separate the anode receptive space 41 of each sub-cell housing from the cathode receptive space 11 of each sub-cell to eliminate contact between the spaces. The separator layer 30 can be configured with a precise thickness to ensure it is void of open pores. In a preferred embodiment, the thickness of the separator layer can be range between 0.00001 mm to 1.0 mm. The thickness of the anode receptive space 41 and cathode receptive space 11 can be configured to optimize the performance of the specific materials. The configuration of the open volume and the solid-state electrolyte strands are also designed to optimize the performance of the specific materials.

As indicated above, the cathode layers 10 can include cathode receptive space 11 partially or completely filled with catholyte. The low porosity ceramic walls can be positioned around at least a portion of the cathode receptive space 11 and the cathode current collectors 20 within the cathode receptive space.

The cathode layer 10 can also include a seal structure in a filling aperture 49 (shown in FIG. 2 and FIG. 9) configured to contain the catholyte. The seal structure can be configured to protect the catholyte from the environment and provide pressure relief from the cathode receptive space 11. The separator layer 30 can include electrically insulated ceramic material. In some embodiments, at least a central portion of the electrically insulated ceramic material includes solid-state electrolyte appropriate for the design charge transfer species of the sub-cell. The low porosity ceramic walls can also include solid-state electrolyte material and serve as protective packaging for the sub-cell.

In a preferred embodiment, the multilayered structure of anode receptive space 41, the cathode receptive space 11, the separators 30 and the current collectors 50 and 20 can be assembled without either catholyte or anode active materials present. The catholyte material can be inserted through the filling aperture 49 (shown in FIG. 2 and FIG. 9) and sealed in place in the cathode layer 10. The catholyte material can be made up of cathode active material, an electrolyte for the charge transfer ion of the sub-cell, and an electron conducting material. The electron conducting material can include carbon, a metal or an electron conductive ceramic. The cathode active material can be made up of an intercalation host material suitable for the charge transfer ion.

Figure 5:
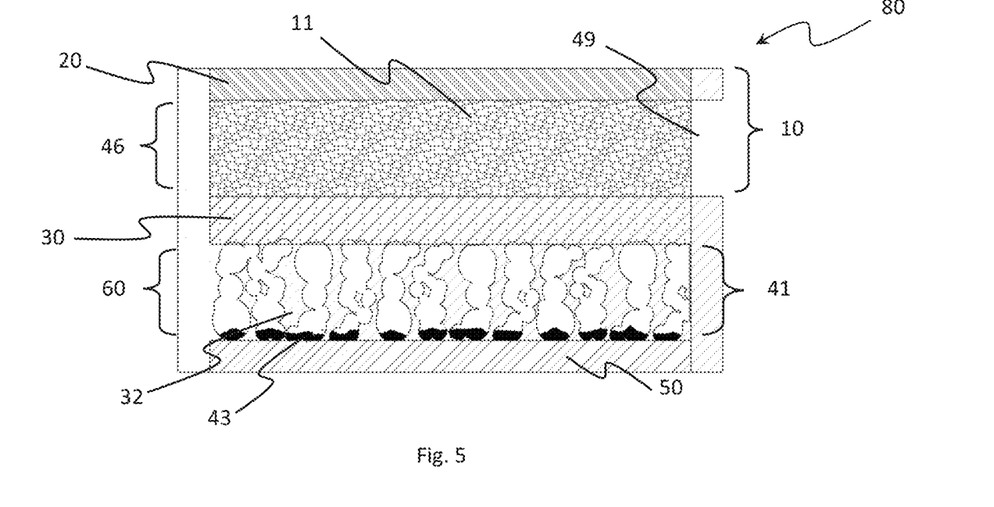
FIG. 5 illustrates a sub-cell housing, in accordance with an embodiment of the disclosure.

Referring specifically to FIG. 5, the empty space 42 of the porous anode receptive space 41 can be partially filled with anode active material 43 during the initial charging of the battery. In some embodiments, the anode active material 43 can include lithium metal. The anode active material can be electro plated onto the anode current collector to initiate the filling of the anode receptive space 41. The anode active material can then be electro plated onto the previously plated anode active material until the anode receptive space 41 fills with the anode active material 43.

The catholyte material can be inserted in the cathode receptive space 10 by converting the catholyte material to a fluid and drawing the fluid material into the porous structure under vacuum force. In some embodiments, converting the catholyte materials to a fluid can include melting the catholyte materials, compounding the catholyte materials into a mixture of solid and liquid materials, dissolving the catholyte materials in a solvent, or converting the catholyte materials to a fine powder. In an alternative embodiment, the catholyte material can be configured as solid or semi solid structure. The structure can be shaped to precisely fit the cathode receptive spaces. In this embodiment, the catholyte material structures can directly inserted and secured in the respective cathode receptive spaces.

The sub-cell can be configured to enable the introduction of the catholyte material into the cathode receptive spaces, without damaging the rest of the structure. For example, the sub-cell can be configured such that all cathode receptive spaces are sealed continuously along at least three quarters of the edges of the sheet like volume, by low porosity ceramic walls 46. In some embodiments, the cathode receptive spaces are open from over $\frac{1}{1,000}$ to $\frac{1}{2}$ of the total circumference. In some embodiments, the cathode receptive spaces are open at a first location of the stack of cell layers. The first location enables the filling aperture of the cathode receptive spaces to be immersed into a fluid catholyte material. In some embodiments, the filling aperture can be fully immersed in the fluid catholyte material.

Figure 10:
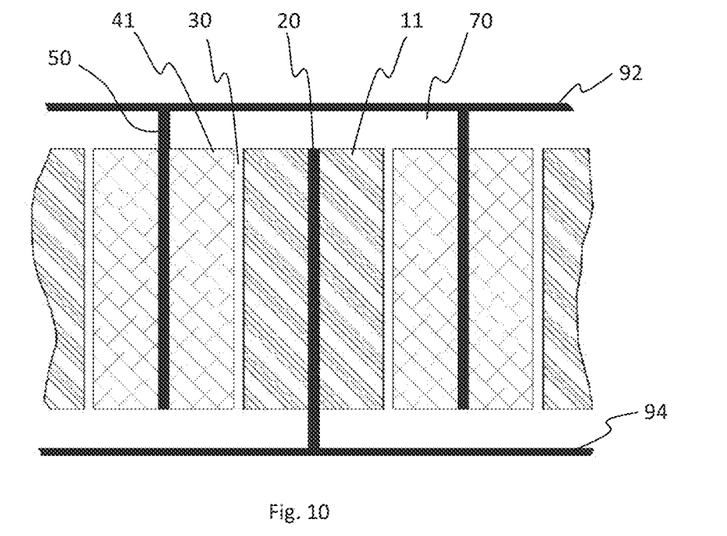
FIG. 10 illustrates a cell schematic of the exemplary solid-state cell of FIG. 1, in accordance with an embodiment of the disclosure.

Further, the sub-cell includes an anode electrical contact 92 of FIG. 10 and FIG. 11, connecting all of the anode sub cell current collectors. The anode electrical contact can include an extension for making electrical contact on the outside of the sub-cell. The sub-cell also includes a cathode electrical contact 94 of FIG. 10 and FIG. 11, connecting all of the cathode sub cell current collectors. The cathode electrical contact can also include an extension accessible for making electrical contact on the outside of the sub-cell.

In some embodiments, the electrolyte structure is the basic framework and exoskeleton of the solid-state cell 100. A continuous electrolyte is required within the anode region to transport lithium ions to and from electron conductive sites. The solid-state electrolyte can also serve as the separator 30 between anode and cathode regions, as a fully dense ceramic structure preventing growth of lithium dendrites during a cell charging cycle. In the anode and cathode regions, the electrolyte can form a porous structure that emulates a liquid electrolyte, allowing ion transfer throughout the three-dimensional space regardless of the state of charge. The electrolyte structure can seal the edges of the electrode regions, effectively completing a package around the sub-cell. The result is a structure of alternating dense and porous layers, integrated as a continuous structure throughout the cell with no apparent discontinuity at the interface of layers of similar material. At interfaces of chemically dissimilar materials, properties of the dissimilar materials are configured such that the only discontinuity at such interfaces is in the chemical composition of the interfacing layers.

In some embodiments, assembly of the solid-state cell structure is accomplished by sequential deposition of layers or partial layers. The deposition of layers or partial layers can be patterned appropriately for the function of the individual layers, as precursors of the desired final materials. The precursors include mixtures of materials that form desired high density and electrochemical properties after a heat treatment. The mixture of materials can also act to bind the precursor materials in the predetermined configuration. The binding materials can be separate materials from those that form the desired end material. In this case, the binding materials are removed from the structure during the heat-treating process. In other embodiments, the binding materials can form the desired end material and have binding properties.

Figure 6:
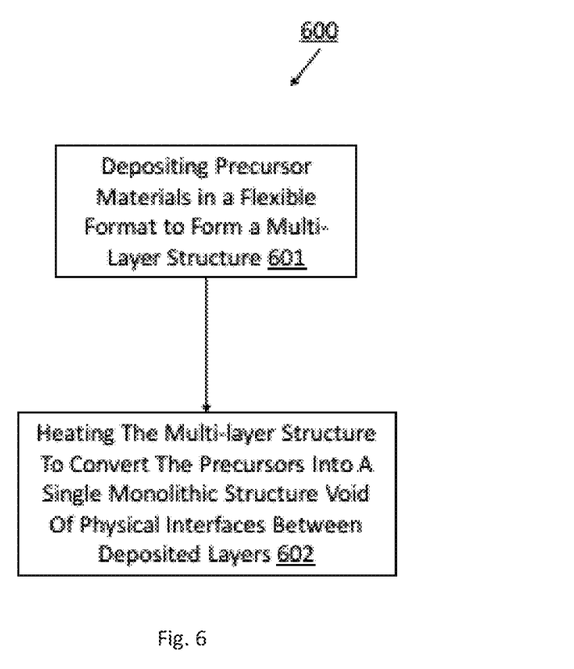
FIG. 6 is a flow chart illustrating manufacturing method of a sub-cell housing, in accordance with an embodiment of the disclosure.

FIG. 6 is a flow chart illustrating the manufacturing process of a sub-cell housing. At step 601, the precursor materials are deposited in formats which are highly flexible and not brittle. For example, the precursor materials can be deposited as a fluid, including sheets which are easily plastically deformed without sacrificing the integrity of the sheet. The fluids can include pastes, flowable powders and green tapes. It should be understood that the precursors can be deposited in one format or a combination of two or more formats. After all the layers of the cell structure are deposited, the completed structure can be heat treated to convert the precursors to the desired physical and electrochemical properties at Step 602. Furthermore, the heat treatment creates a single monolithic structure with no physical interfaces between the deposited layers.

In some embodiments, the precursors can be deposited using additive manufacturing techniques. For example, the precursors can be deposited using a three-dimensional (3D) printer accompanied by a computer system and guided by CAD data for each layer of the structure. In alternative embodiments, the precursors can be deposited as layers of green (unfired) tape, prepared to the desired patterns, stacked in the design order and laminated together. In alternative embodiments, both 3D printing and laminated tape deposition processes can be incorporated to form the complete structure.

Although the cathode contains organic liquid electrolyte, the overall volume of liquid in the solid-state cell is about 10% of that in a standard LIB. This reduction of liquid greatly reduces the explosion and fire potential of the solid-state cell 100 compared to a standard LIB.

While some embodiments have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The terminology used herein is for the purpose of describing particular embodiments only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A monolithic ceramic electrochemical cell comprising:
a first electrochemical sub cell housing comprising a first anode receptive space, a cathode receptive space, a first separator between the first anode receptive space and the cathode receptive space; and
a second electrochemical sub cell housing comprising a second anode receptive space, the cathode receptive space, and a second separator between the second anode receptive space and the cathode receptive space, the cathode receptive space being the cathode receptive space for the first electrochemical sub cell housing and the second electrochemical sub cell housing;
wherein the cathode receptive space is bounded on at least one side by a cathode current collector.

2. The monolithic ceramic electrochemical cell of claim 1, wherein the cathode receptive space is bounded on one side by a first cathode current collector and on the other side by a second cathode current collector.

3. The monolithic ceramic electrochemical cell of claim 2, wherein the first electrochemical sub cell housing comprises the first cathode current collector and wherein the second electrochemical cell housing comprises the second cathode current collector.

4. The monolithic ceramic electrochemical cell of claim 1, wherein the cathode receptive space comprises a filling aperture configured to contain catholyte, the filling aperture including a seal and wherein the seal is configured to isolate the catholyte and provide pressure relief from the cathode receptive space.

5. The monolithic ceramic electrochemical cell of claim 1, wherein the first electrochemical cell sub cell housing comprises a first plurality of integrated electron conductive circuits and wherein the second electrochemical sub cell housing comprises a second plurality of integrated electron conductive circuits.

6. The monolithic ceramic electrochemical cell of claim 5, wherein the first and second plurality of integrated electron conductive circuits each comprise an anode current collector and a cathode current collector.

7. The monolithic ceramic electrochemical cell of claim 1, wherein the anode receptive spaces are configured as hermetically sealed volumes, partially filled with a solid-state electrolyte.

8. The monolithic ceramic electrochemical cell of claim 7, wherein the solid-state electrolyte comprises a ceramic.

9. The monolithic ceramic electrochemical cell of claim 8, wherein the ceramic is selected from a group consisting of: sulfides, borides, carbides, nitrides, phosphides, oxides, selenides, fluorides, chlorides, bromides, iodides, and combinations thereof.

10. The monolithic ceramic electrochemical cell of claim 7, wherein the solid-state electrolyte forms a network of continuous ionic conductivity between the separator and a first anode current collector and a second anode current collector.

11. The monolithic ceramic electrochemical cell of claim 10, wherein the solid-state electrolyte occupies between 20% and 80% volume of the first and second anode receptive spaces.

12. The monolithic ceramic electrochemical cell of claim 6, wherein the anode current collector serves as a current collector for the first anode receptive spaces of the first electrochemical sub cell housing and the current collector for the second anode receptive spaces of the second electrochemical sub cell housing.

13. The monolithic ceramic electrochemical cell of claim 1, wherein the cathode receptive space is partially filled with strands of ceramic material between 1% and 60% volume.

14. The monolithic ceramic electrochemical cell of claim 1, further comprising insulating material between the first electrochemical sub cell housing and the second electrochemical sub cell housing.

15. The monolithic ceramic electrochemical cell of claim 1, wherein the first and second anode receptive spaces are sealed and the cathode receptive space is partially sealed.

16. The monolithic ceramic electrochemical cell of claim 6, wherein a first cathode current collector is in direct contact with a surface of the first separator and a second cathode current collector is in direct contact with a surface of the second separator, the first separator and the second separator encompassing the cathode receptive space.

17. The monolithic ceramic electrochemical cell of claim 6, wherein the cathode current collectors comprise one selected from the group consisting of a metal, a conductive ceramic, and a conductive carbon based material.

18. The monolithic ceramic electrochemical cell of claim 17, wherein the cathode current collectors further comprise an ion conducting material to conduct an intended charge transfer ion of a specific battery design.

19. The monolithic ceramic electrochemical cell of claim 18, wherein the ion conducting material comprises lithium lanthanum zirconate.

20. The monolithic ceramic electrochemical cell of claim 17, wherein the cathode current collectors comprise a porous film that forms an electronic percolating network through a plane of the cathode current collectors.

21. The monolithic ceramic electrochemical cell of claim 17, wherein the metal, metal alloy, conductive ceramic or conducting carbon material comprises between 20% and 99% by volume of the cathode current collector.

* * * * *